United States Patent [19]

Lehmann

[11] 4,332,713

[45] Jun. 1, 1982

[54] LIQUID OR PASTY THERMOSETTING ADHESIVE WHICH CAN BE PRE-GELLED AND WHICH IS BASED ON EPOXIDE RESIN, AND THE USE OF THIS ADHESIVE

[75] Inventor: Hans Lehmann, Aesch, Switzerland

[73] Assignee: Ciba-Geigy Corporation, Ardsley, N.Y.

[21] Appl. No.: 202,021

[22] Filed: Oct. 29, 1980

[30] Foreign Application Priority Data

Nov. 9, 1979 [CH] Switzerland .................... 10047/79

[51] Int. Cl.$^3$ .............................................. C08K 5/01
[52] U.S. Cl. .................................... 156/328; 525/110; 525/119; 525/120; 525/113; 525/423; 156/330; 523/464
[58] Field of Search .................. 260/29.8, 13; 525/58, 525/119, 120, 423, 110, 113; 156/328, 330

[56] References Cited

U.S. PATENT DOCUMENTS

| | | |
|---|---|---|
| 2,713,567 | 7/1955 | Scheibli . |
| 3,371,008 | 2/1968 | Lopez . |
| 3,519,576 | 7/1970 | Johnson . |
| 3,530,087 | 9/1970 | Hayes et al. . |
| 3,634,169 | 1/1972 | Garnish . |
| 3,641,195 | 2/1972 | Ball et al. . |
| 4,112,128 | 9/1978 | Fessler . |
| 4,122,128 | 10/1978 | Lehmann . |

FOREIGN PATENT DOCUMENTS

| | | |
|---|---|---|
| 535616 | 1/1957 | Canada .................................... 525/58 |
| 933355 | 9/1955 | Fed. Rep. of Germany . |
| 1266688 | 3/1972 | United Kingdom . |
| 1306231 | 2/1973 | United Kingdom . |

OTHER PUBLICATIONS

CA, 49, 14344a (1955) (=AB)
CA, 52, 17813h (1958) (=AL)

*Primary Examiner*—Joseph L. Schofer
*Assistant Examiner*—Bernard Lipman
*Attorney, Agent, or Firm*—Luther A. R. Hall

[57] ABSTRACT

A liquid or pasty thermosetting adhesive which can be pre-gelled, which is suitable for the bonding of moulded parts or for the sealing of folded seams, and which contains (a) a liquid epoxide resin having on average more than one epoxide group in the molecule, and (b) a latent epoxide curing agent insoluble in the epoxide resin, the adhesive being characterized in that it also contains (c) in an amount of 5 to 50 percent by weight relative to the epoxide resin, at least one halogen-free thermoplast in powder form, which is insoluble in the epoxide resin at room temperature, and which has a softening point of between 60° and 160° C., such as a polyethylene, a polypropylene or an ethylene/acrylic acid/acrylate terpolymer.

9 Claims, No Drawings

LIQUID OR PASTY THERMOSETTING ADHESIVE WHICH CAN BE PRE-GELLED AND WHICH IS BASED ON EPOXIDE RESIN, AND THE USE OF THIS ADHESIVE

The use of an adhesive for bonding moulded parts, which adhesive is based on epoxide resin, which is liquid at room temperature, and which contains an addition of PVC plastisol, is known for example from the German Offenlegungsschrift No. 2,002,880. The adhesive layer applied to the parts to be bonded together gels on being briefly heated to a temperature above the melting point of the PVC; there is subsequently obtained on cooling a non-tacky film which, when heated for a longish period at 160°–180° C., firstly melts and then cures. Pre-gelled adhesives of this type have the advantage that a moulded part coated therewith, which cannot be bonded immediately after application, requires merely to be briefly heated, so that when being subsequently handled it does not contaminate tools, work areas, clothing and the skin. There is furthermore no danger that the adhesive on metal sheets treated in this manner will be washed away if the sheets are passed through a cleansing or phosphating bath. Before the adhesive between the surfaces to be bonded together is cured, which usually occurs during the stoving of the priming lacquer, the joined parts can still be adjusted to ensure correct positioning. A disadvantage is the splitting-off of corrosive gases from the PVC, a phenomen which cannot be avoided at the high temperatures that have to be applied for stoving and particularly for spot welding. Such operations are performed for example to effect the bonding or sealing of folded seams in the automobile industry.

If the PVC plastisol is left out of the epoxide resin, there is a risk of the adhesive being partially washed out in the phosphating baths and having a contaminating effect during further processing of the coated parts.

The procedure of adding to an epoxide resin/curing agent mixture a thermoplast, for example polyolefin, phenoxypolysulfone resin or a copolymer formed from ethylene, acrylic acid and acrylate, and of producing from the mixture films, which are then placed, for bonding moulded articles, between the surfaces to be bonded together, and subsequently cured by the action of heat, is known for example from the German Offenlegungsschriften Nos. 1,935,115, 1,720,438 and 2,800,306. The surfaces of the parts to be bonded must however be flat or uniformly curved or otherwise suitable in order that the adhesive action can be fully effective. Application of the adhesive by means of a spray gun is not possible.

Solvents can be added to solid mixtures of the types mentioned in order to obtain liquid mixtures, as is described for example in German Offenlegungsschrift No. 2,052,225. A disadvantageous feature of this method is that it is necessary before bonding to remove the solvent, an operation which is costly, and in many works not without danger. Furthermore, the volume of adhesive becomes smaller, and its joint-filling capacity is considerably reduced.

There has now been found a liquid or pasty, so-called one-component adhesive which does not have the disadvantages mentioned. It can be applied to uneven surfaces, for example by means of a spray gun, and, after being briefly heated, it remains for a considerable time capable of forming a bond on the surfaces, but at the same time being dry to the touch, so that the parts provided with the adhesive can be handled without contamination occurring and without the risk of the adhesive being washed off. Furthermore, no corrosive gases are formed on subsequent treatment of the bonded parts at elevated temperatures. The invention thus relates to a liquid or pasty thermosetting adhesive which can be pre-gelled and which is based on epoxide resin, and which contains a liquid epoxide resin having on average more than one epoxide group in the molecule, or a liquid mixture of epoxide resins having on average more than one epoxide group in the molecule, a latent curing agent for epoxide resins, which is insoluble in the epoxide resin at room temperature, and optionally accelerators, wetting agents, thixotropic agents, levelling agents, pigments and other customary auxiliaries and fillers, the adhesive being characterised in that it contains, in an amount of 5 to 50 percent by weight relative to the epoxide resin, at least one halogen-free thermoplast in powder form, which is insoluble in the epoxide resin at room temperature, and which has a softening point of between 60° and 160° C.

The epoxide resins used can be any liquid resins having more than one 1,2-epoxide group in the molecule; also liquid mixtures of solid and liquid epoxide resins can be used. Epoxide resins preferably used are those having equivalent weights of 150–300. Examples which may be mentioned are polyglycidyl compounds, such as diglycidyl ethers based on bisphenol A or F or on resorcin; polyglycidyl ethers of phenol novolaks or cresol novolaks; diglycidyl ethers of hydrogenated bisphenol A; and also diglycidyl esters of phthalic acid, hexahydrophthalic acid and tetrahydrophthalic acid.

Suitable curing agents insoluble in epoxide resins at room temperature are for example: dicyandiamide, melamine, guanamine and polycarboxylic acid polyhydrazides, also carboxylic acid imides and imidazole derivatives.

The amount of curing agent added has to be sufficient to convert the epoxide resin into an insoluble, unmeltable crosslinked product. The amount is easily determined by tests. There can be used for example 5 to 20 parts by weight of dicyandiamide to 100 parts by weight of epoxide resin.

The accelerators used are for example: imidazole, monuron, chlorotoluron, and similar substances; the levelling agents used are for example: silanes or butanediol acrylates; and the thixotropic agents used are for example: silicon dioxides (such as "Aerosil" ®), types of asbestos (such as "Silodex" ®) or bentonites (such as "Bentone" ®). These materials can be used for example in amounts of 1–20 parts by weight to 100 parts by weight of epoxide resin. The adhesive can also contain, in amounts of 1–100 parts by weight relative to the epoxide resin, fillers, for example metal powder such as aluminium powder; silicates such as talcum; carbonates such as chalk; and pigments.

To improve the adhesive strength of the adhesive on oily metal sheets, the paste can contain a liposoluble additive, such as limonene, dipentene or oil of turpentine, in an amount of 1–10 percent by weight, relative to the adhesive.

Preferred thermoplastic materials, which the adhesive contains in the form of powder, are those having a low softening point, particularly polyethylene, polypropylene and ethylene/acrylic acid/acrylate terpolymers; and also polyamide, ethyl cellulose, polyvinyl formal and polyvinyl butyral are preferred materials. An addition of 5–20 percent by weight, relative to the epoxide resin, is in general sufficient to render the product capable of being pre-gelled. The powder grains preferably have a diameter of 5 to 200 μm. Thermoplasts which are soluble in epoxide resins at room temperature, such as ABS resins, are not readily applicable.

Capable of being pre-gelled means that the adhesive applied to the surfaces to be bonded together has the property of being able to form, on being heated briefly to a temperature above the melting point of the thermoplast and subsequently cooled, a coating which is non-tacky and dry to the touch. The adhesive is advantageously heated to at least 20° C. above the melting point of the thermoplast, for example for 10–30 seconds at about 180° C., or for a few minutes, for example 3–5 minutes, at 120°–150° C. These temperatures and times depend on the nature of the employed resin, curing agent and thermoplast, and on the amount of adhesive. The best conditions can easily be determined by trial tests. The dry pre-gelled coating becomes liquid again when heated, and cures on further heating.

The invention relates also to a process for the bonding of moulded parts or for the sealing of folded seams, which process comprises applying to the surfaces to be bonded or to the folded seams to be sealed an adhesive according to the invention; heating the adhesive to a temperature higher than the melting temperature of the thermoplast, and holding it at this temperature until it is able, on being cooled to room temperature, to form a non-tacky coating dry to the touch, the coated parts then being cooled, and the adhesive subsequently cured by heating after the parts have been joined together.

The bonding or sealing process can be advantageously used for the bonding of oily metal sheets, for example in the automobile industry.

EXAMPLES 1 TO 6 AND COMPARATIVE EXAMPLE A

The adhesives in these Examples are of the same base material and differ only with respect to the thermoplast or to the amount of thermoplast. The base material without the addition of a thermoplast is used as the comparative adhesive A.

The base material or comparative adhesive A is produced as follows:

80 parts by weight of a liquid epoxide resin, produced from epichlorohydrin and bisphenol-A, having an epoxide equivalent of 188, and 20 parts by weight of an adduct, produced from a liquid bisphenol-A epoxide resin and an acid polyester formed from neopentyl glycol and sebacic acid, having an epoxide equivalent of 455, are mixed together at room temperature with 5 parts by weight of d-limonene, 6 parts by weight of dicyandiamide, 6 parts by weight of monuron (p-chlorophenyl-dimethylurea), 10 parts by weight of talcum powder and 4 parts by weight of "Aerosil" (surface area 308 m²/g), and the mixture is ground in a roller mill to reduce the particle size. There is formed a smooth, slightly thixotropic paste which cures at 150° C. within 30 minutes. Pre-gelling by a brief heating at 180° C. is not possible.

EXAMPLES 1–6

Specific amounts of a thermoplast (cp. Table I) are added by mixing to 100 parts by weight of comparative adhesive A at room temperature, and the formed paste is applied, in a coating thickness of 0.5 mm, to a slightly oily steel sheet. The coated sheet is then placed onto a heating plate at 185° C.; and, after reaching 180° C. (checked by means of fixed melting-point salt), the sheet is left there for 20 seconds, and subsequently cooled to room temperature. In contrast to the surface obtained in the comparative Example, there is formed in this Example a surface which is dry to the touch, and which becomes liquid again on being heated to 100° C. After being joined together, the sheets coated in this manner are heated at 150° C. for 30 minutes to effect curing of the coatings.

The tensile shearing strength values are summarised in Table I. They were determined according to DIN 53283.

TABLE I

| Example | Thermoplast powder | Amount added to 100 parts by weight of resin | Surface of an 0.5 mm film after 20 seconds at 180° C. | Tensile shearing strength in N/mm² | |
|---|---|---|---|---|---|
| | | | | at 25° C. | at 80° C. |
| comparative A | — | — | tacky | 20–22 | 20–22 |
| 1 | polyethylene | 5 parts by wt. | dry | 23–25 | 20–22 |
| 2 | polyethylene | 20 parts by wt. | dry | 18–20 | 14–16 |
| 3 | ethyl cellulose | 10 parts by wt. | dry | 22–24 | 17–18 |
| 4 | ethylene/acrylic acid/acrylate terpolymer ("Lupolen") | 10 parts by wt. | dry | 23–25 | 18–20 |
| 5 | polyvinyl formal 12/85 | 10 parts by wt. | dry | 24–26 | 16–18 |
| 6 | polyamide 5000 | 10 parts by wt. | dry | 23–25 | 19–21 |

EXAMPLE 7

80 parts by weight of a liquid epoxide resin, based on epichlorohydrin and bisphenol-A, having an epoxide equivalent of 188, and 10 parts by weight of an adduct, produced from a liquid bisphenol-A epoxide resin and an acid polyester formed from neopentyl glycol and sebacic acid, having an epoxide equivalent of 455, and 10 parts by weight of butanediol glycidyl ether having an epoxide equivalent of 108 are mixed at room temperature with 2 parts by weight of d-limonene, 6 parts by weight of dicyandiamide, 4 parts by weight of p-chlorophenyl-dimethylurea, 60 parts by weight of powdered chalk, 5 parts by weight of "Aerosil" and 8 parts by weight of polyvinyl butyral powder ("Mowital B 20 H", Fa.Hoechst), and the mixture is ground on a roller mill to reduce the particle size. The result is a smooth paste which cures at 150° C. within 30 minutes.

The determination of the reaction time to obtain 0.5 mm films having a surface dry to the touch is carried out at different temperatures. The values are compared with those obtained from a comparative mixture B containing no polyvinyl butyral: see Table II. The tensile shearing strengths are also measured as described in Examples 1-6.

TABLE II

| Pre-gelling temperature °C. | Reaction time to obtain a surface dry to the touch at 25° C. | | Tensile shearing strength in N/mm² | |
|---|---|---|---|---|
| | Example B | Example 7 | at 25° C. Example 7 | at 80° C. Example 7 |
| 140 | 7-8 min. | 3-4 min. | 20-22 | 18-20 |
| 120 | 18-20 min. | 8-9 min. | | |

What is claimed is:

1. A liquid or pasty thermosetting adhesive, which can be pre-gelled and which is based on epoxide resin, which consists essentially of
   (a) a liquid epoxide resin having on average more than one epoxide group in the molecule or a mixture of said liquid epoxide resins,
   (b) an effective amount of a latent curing agent for epoxide resin, which is insoluble in the epoxide resin at room temperature, and which is selected from the group consisting of dicyandiamide, melamine, guanamine, polycarboxylic acid polyhydrazides, carboxylic acid imides and imidazole derivatives, and
   (c) 5 to 50% by weight, relative to the epoxide resin, of at least one halogen-free thermoplast in powder form, which is insoluble in the epoxide resin at room temperature, and which thermoplast has a softening point of between 60° and 160° C.

2. An adhesive according to claim 1, which contains as thermoplast: polyethylene, polypropylene or an ethylene/acrylic acid/acrylate terpolymer.

3. An adhesive according to claim 1, which contains as thermoplast: polyamide, ethyl cellulose, polyvinyl formal or polyvinyl butyral.

4. An adhesive according to any claim 1, which contains at least one thermoplast in an amount of 5 to 20 percent by weight, relative to the epoxide resin.

5. An adhesive according to claim 1, which contains dicyandiamide as a curing agent for epoxide resins.

6. An adhesive according to claim 1, which contains, as liposoluble additive, limonene, dipentene or turpentine oil, in an amount of 1-10 percent by weight relative to the adhesive.

7. An adhesive according to claim 1, which contains a liquid epoxide resin mixture, 1-10 percent by weight, relative to the adhesive, of limonene, 5-20 percent by weight, relative to the epoxide resin, of polyvinylbutyral powder, 5-20 percent by weight, relative to the epoxide resin, of dicyandiamide, 1-20 percent by weight, relative to the epoxide resin, of a thixotropic agent, 1-20 percent by weight, relative to the epoxide resin, of an accelerator, and 1-100 percent by weight, relative to the epoxide resin, of a filler.

8. A process for the bonding of moulded parts or for the sealing of folded seams, which process comprises applying to the surfaces to be bonded or to the folded seams to be sealed an adhesive according to claim 1; heating the adhesive to a temperature higher than the melting temperature of the thermoplast, and holding it at this temperature until it is able, on being cooled to room temperature, to form a non-tacky coating dry to the touch, the coated parts then being cooled, and the adhesive subsequently cured by heating after the parts have been joined together.

9. A process according to claim 8, in which polyethylene powder having a melting range of 116°-119° C. is added as thermoplast to the adhesive, and the pre-gelling is effected for 10-30 seconds at about 180° C.

* * * * *

UNITED STATES PATENT AND TRADEMARK OFFICE
CERTIFICATE OF CORRECTION

PATENT NO. : 4,332,713
DATED : June 1, 1982
INVENTOR(S) : Hans Lehmann

It is certified that error appears in the above—identified patent and that said Letters Patent is hereby corrected as shown below:

Column 6, line 10, "as liposoluble additive, limonene, dipentene or turpen-" should read -- as a liposoluble additive, limonene, dipentene or turpen- --.
Delete claims 8 and 9.
On the title page "9 Claims" should read -- 7 Claims --.

Signed and Sealed this

Twelfth Day of October 1982

[SEAL]

Attest:

Attesting Officer

GERALD J. MOSSINGHOFF
Commissioner of Patents and Trademarks

Disclaimer 4,332,713.—*Hans Lehmann,* Aesch, Switzerland. LIQUID OR PASTY THERMOSETTING ADHESIVE WHICH CAN BE PREGELLED AND WHICH IS BASED ON EPOXIDE RESIN, AND THE USE OF THIS ADHESIVE. Patent dated June 1, 1982. Disclaimer filed July 5, 1983, by the assignee, *CIBA-GEIGY Corp.*

Hereby enters this disclaimer to claims 1 and 3 of said patent.

[*Official Gazette August 30, 1983.*]